US012625944B2

(12) United States Patent
Orlov et al.

(10) Patent No.: US 12,625,944 B2
(45) Date of Patent: May 12, 2026

(54) SYSTEMS AND METHODS FOR PROVIDING CONTAINERIZED APPLICATIONS WITH UPDATED SECRET VALUES

(71) Applicant: Salesforce, Inc., San Francisco, CA (US)

(72) Inventors: Victor Orlov, Melbourne (AU); Gulshankumar Shrawankumar Arora, Munich (DE)

(73) Assignee: Salesforce, Inc.

( * ) Notice: Subject to any disclaimer, the term of this patent is extended or adjusted under 35 U.S.C. 154(b) by 100 days.

(21) Appl. No.: 18/809,220

(22) Filed: Aug. 19, 2024

(65) Prior Publication Data

US 2026/0050663 A1     Feb. 19, 2026

(51) Int. Cl.
*G06F 21/44* (2013.01)

(52) U.S. Cl.
CPC ........ *G06F 21/44* (2013.01); *G06F 2221/033* (2013.01)

(58) Field of Classification Search
CPC ............................ G06F 21/44; G06F 2221/033
USPC ........................................................... 726/18
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |

| | | | |
|---|---|---|---|
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |

(Continued)

*Primary Examiner* — Michael S McNally
(74) *Attorney, Agent, or Firm* — Ingrassia Fisher & Lorenz, LLP

(57) ABSTRACT

A method and system for providing containerized applications with updated secret values has been developed. An update to a secret from a first secret value to a second secret value is detected at a secrets vault. A configuration map associated with the secret is identified. The configuration map includes a first non-secret that is associated with the first secret value. A second non-secret that is associated with the second secret value is generated. The first non-secret is replaced with the second non-secret in the configuration map. The replacement of the first non-secret with the second non-secret in the configuration map results is an event. A reloader issues a restart signal to a containerized application associated with the secret in response to the event. The secret at the containerized application is updated from the first secret value to the second secret value during a restart process.

20 Claims, 6 Drawing Sheets

(56) References Cited

U.S. PATENT DOCUMENTS

| | | | |
|---|---|---|---|
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,730,478 B2 | 6/2010 | Weissman | |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 10,599,454 B2 | 3/2020 | Bailey | |
| 11,269,668 B2 | 3/2022 | Bailey | |
| 11,321,422 B1 | 5/2022 | Stone et al. | |
| 11,797,638 B2 | 10/2023 | Stone et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2008/0249972 A1 | 10/2008 | Dillon | |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2011/0247051 A1 | 10/2011 | Bulumulla et al. | |
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2017/0359172 A1* | 12/2017 | Chen | H04L 9/0891 |
| 2022/0245206 A1 | 8/2022 | Stone et al. | |
| 2023/0251910 A1* | 8/2023 | Holt | G06F 3/0486 |
| | | | 719/328 |

* cited by examiner

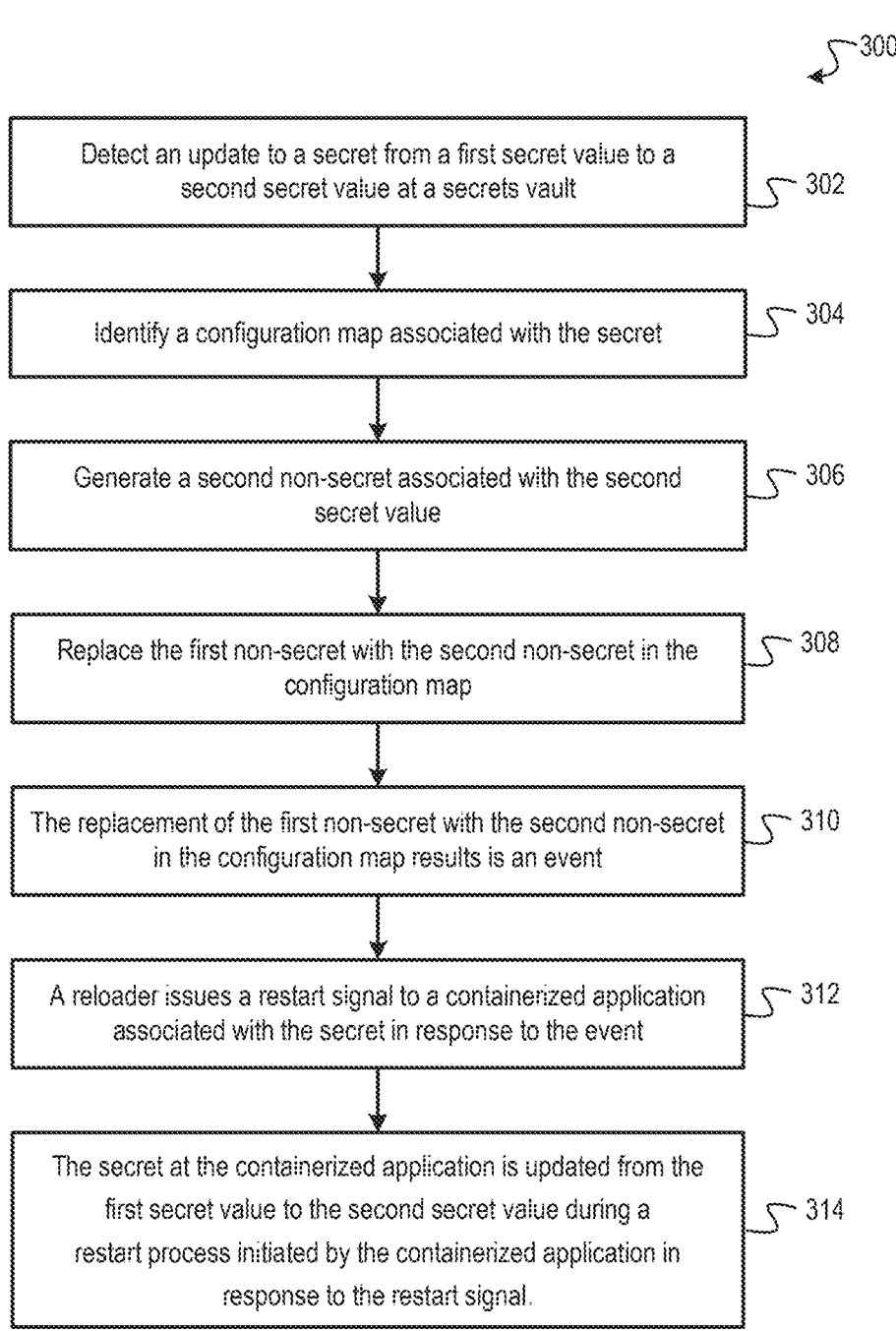

300

Detect an update to a secret from a first secret value to a second secret value at a secrets vault ⟋ 302

Identify a configuration map associated with the secret ⟋ 304

Generate a second non-secret associated with the second secret value ⟋ 306

Replace the first non-secret with the second non-secret in the configuration map ⟋ 308

The replacement of the first non-secret with the second non-secret in the configuration map results is an event ⟋ 310

A reloader issues a restart signal to a containerized application associated with the secret in response to the event ⟋ 312

The secret at the containerized application is updated from the first secret value to the second secret value during a restart process initiated by the containerized application in response to the restart signal. ⟋ 314

FIG. 3

SYSTEMS AND METHODS FOR PROVIDING CONTAINERIZED APPLICATIONS WITH UPDATED SECRET VALUES

TECHNICAL FIELD

Embodiments of the subject matter described herein relate generally to containerized applications and more particularly, embodiments of the subject matter relate to systems and methods for providing containerized applications with updated secret values.

BACKGROUND

A Kubernetes cluster includes a group of computing nodes. Each of the computing nodes includes a plurality of pods. Each of the pods includes a plurality of containerized applications. The containerized application may ingest their configuration data at a start time. The configuration data includes secrets. Secrets are credentials that allow the containerized applications to access protected resources and sensitive information. Each secret enables access to a specific protected resource and/or sensitive information. Many containerized applications are provided with the secret values of the secrets specific to the resources and/or sensitive information that the containerized application is allowed to access when the containerized application is restarted.

The secret values of the secrets are typically maintained at a secrets vault. The secrets vault may also be referred to as a secrets store. The secret values of the secrets are periodically changed or rotated to ensure compliance with security requirements via a secret values updating process. Currently, updated secret values are often delivered to the Kubernetes cluster via a container storage interface (CSI) secrets store driver as a volume mount. While the CSI mounted volume content may change if a secret value is updated, a running containerized application may not be aware of the secret value change.

Accordingly, there is a need in the art for methods and systems for providing containerized applications with updated secret values where updates to secret values of secrets in the secrets database are monitored. The containerized application associated with updated secrets are restarted to ingest the updated secret values responsive to detection of an update to the secret values in the secrets vault.

BRIEF DESCRIPTION OF THE DRAWINGS

The present disclosure will hereinafter be described in conjunction with the following drawing figures, wherein like numerals denote like elements, and wherein:

FIG. 3 is a flowchart representation of an exemplary method of providing containerized applications with updated secret values in accordance with at least one embodiment;

DETAILED DESCRIPTION

Figure 1:
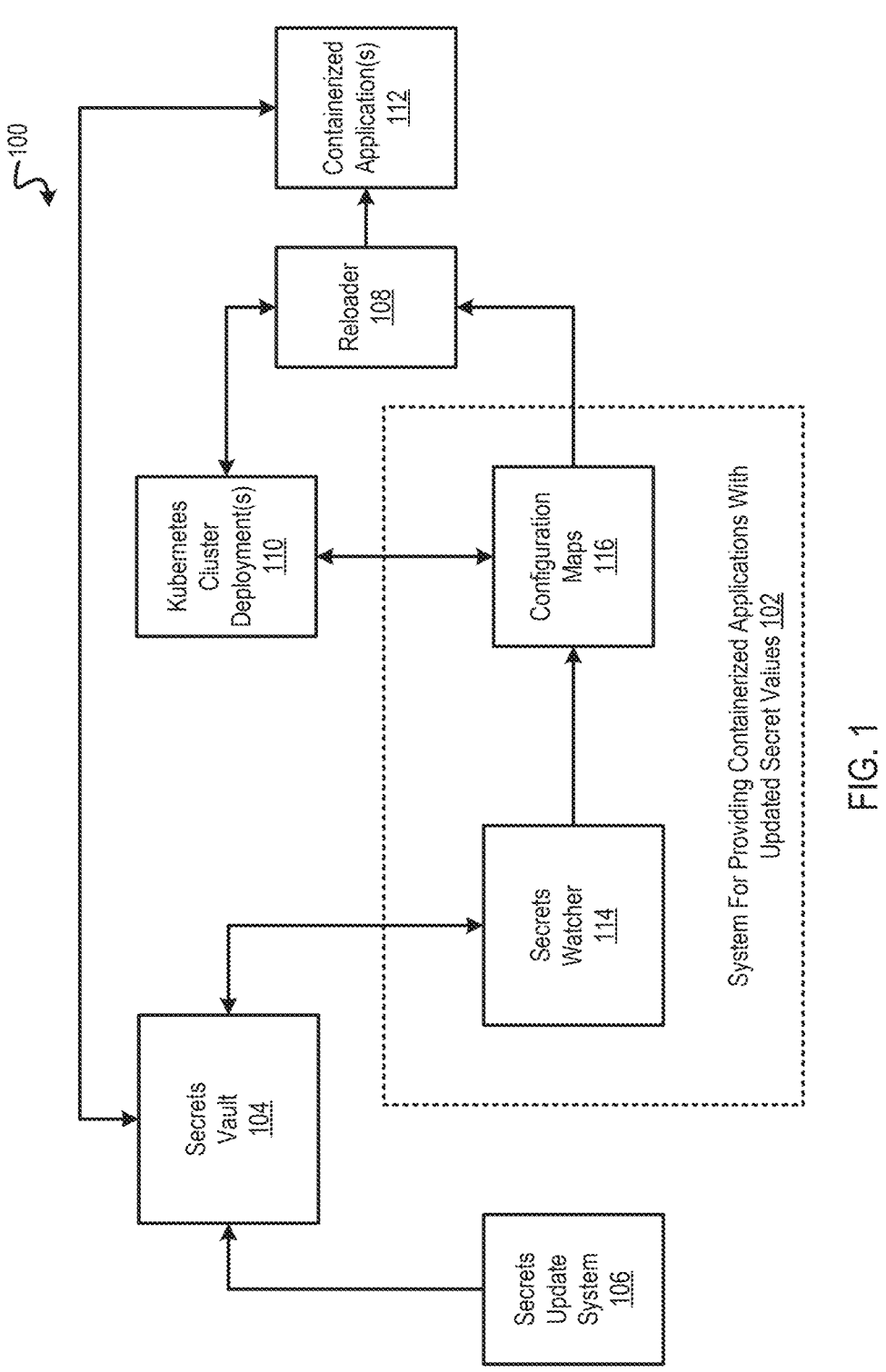
FIG. 1 is a block diagram representation of a system including a system for providing containerized applications with updated secret values in accordance with at least one embodiment.

Referring to FIG. 1, a block diagram representation of a system 100 including a system for providing containerized applications with updated secret values 102 in accordance with at least one embodiment is shown. It should be appreciated that FIG. 1 depicts a simplified representation of the system 100 for purposes of explanation and is not intended to be limiting. The system 100 includes the system for providing containerized applications with updated secret values 102, a secrets vault 104 (also referred to as a "secrets store"), a secrets update system 106, a reloader 108, Kubernetes cluster deployment(s) 110, and a plurality of containerized applications 112. In at least one embodiment, the system for providing containerized applications with updated secret values 102 includes a secrets watcher 114 and a plurality of configuration maps 116 (also referred to as "config maps"). The system 100 may include additional components that facilitate operation of the system 100.

A Kubernetes cluster includes a group of computing nodes. Each of the computing nodes includes a plurality of pods. Each of the pods includes a plurality of containerized applications 112. Containerization is a software deployment and runtime process that bundles the code of a containerized application 112 with the files, libraries, and secrets that the containerized application 112 needs to run on any infrastructure. Kubernetes is an open-source container orchestration software that can manage, coordinate, run, restart, shut down, automate management functions, and schedule containerized applications 112 at scale.

Secrets are sensitive digital credentials that allow a containerized application 112 to access protected systems and services. In at least one embodiment, the secrets are Kubernetes secrets. Kubernetes secrets are objects that store sensitive information. Examples of the sensitive information include, but are not limited to, passwords, OAuth tokens, and secure shell (SSH) keys. The secrets vault 104 is configured to store secret values of the secrets. The secrets vault 104 allows developers to securely store, update, and control access to the secret values of the secrets that are used by the containerized applications 112 in a central location. In at least one embodiment, the secrets vault 104 is a Kubernetes secrets vault. In at least one embodiment, the Kubernetes secrets vault is an open-source secret management service called Vault, developed by HashiCorp.

The secret values of the secrets are rotated on a periodic basis in accordance with security compliance requirements via the secrets update system 106. The secrets updates system 106 transmits the new updated secret values of the secrets to the secrets vault 104.

The system for providing containerized applications with updated secret values 102 includes the secrets watcher 114. The secrets watcher 114 monitors the secrets vault 104 for updates to the secret values of the secrets maintained by the secrets vault 104. In at least one embodiment, there are a plurality of secret watchers 114. In at least one embodiment, there is a secret watcher 114 for each pod in the Kubernetes cluster. Each secrets watcher 114 is configured to monitor the secrets vault 104 for updates to the secret values of the secrets maintained by the secrets vault 104 for the containerized applications 112 in the pod associated with that secrets watcher 114. In at least one embodiment, there is a secret watcher 114 for each Kubernetes cluster. Each secrets watcher 114 is configured to monitor the secrets vault 104 for updates to the secret values of the secrets maintained by the secrets vault 104 for the containerized applications 112 in the Kubernetes cluster associated with that secrets watcher 114.

The system for providing containerized applications with updated secret values 102 includes a plurality of configuration maps 116. Each secret watcher 114 is associated with a plurality of configuration maps 116. In at least one embodiment, the secret watcher 114 creates the plurality of configuration maps 116. Each configuration map 116 is associated with a secret monitored by the secret watcher 114. Each configuration map 116 is configured to store a non-secret associated with a secret value of the secret associated with that configuration map 116. In at least one embodiment, each configuration map 116 is configured to store a secret name associated with a secret and a non-secret associated with a secret value of the secret. The configuration map 116 is not used to store the actual secret value of a secret.

In at least one embodiment, the non-secret associated with the secret value of the secret is a checksum of the secret value. In at least one embodiment, the non-secret associated with the secret value of the secret is an MD5 checksum of the secret value. A MD5 checksum of the secret value is a 128-bit hexadecimal number that is generated from the secret value using a mathematical algorithm called a MD5 hash algorithm. The MD5 hash algorithm produces a unique fingerprint of the characters and the numbers of the secret value. In at least one embodiment, the non-secret is metadata associated with the secret value of the secret. In at least one embodiment, the metadata is a modification/creation time stamp associated with the secret value.

In at least one embodiment, the plurality of configurations maps 116 are stored at the Kubernetes cluster. In at least one embodiment, the plurality of configuration maps 116 are stored in a datastore at the Kubernetes cluster. In at least one embodiment, the datastore is an etcd datastore. Configuration maps 116 are typically used to store non-confidential data. The non-secrets associated with the secret values of the secrets are considered to be non-confidential data.

When the secrets watcher 114 detects an update to a secret value of a secret that is being monitored by the secrets watcher 114 at the secrets vault 104, the secrets watcher 114 identifies the configuration map 116 associated with that secret. In at least one embodiment, a secret name is associated with each of the secrets stored at the secrets vault 104. Each the configuration maps 116 includes the secret name associated with that configuration map 116. The secrets watcher 114 uses the name of the secret that has been updated in the secrets vault 104 to identify the configuration map 116 associated with the updated secret.

The secrets watcher 114 is configured to generate an updated non-secret associated with the updated secret value. The secrets watcher 114 is configured to update the configuration map 116 associated with the updated secret with the updated non-secret value. The secrets watcher 114 replaces the previous non-secret associated with the previous secret value of the secret with the updated non-secret associated with the updated secret value of the secret in the configuration map 116.

The reloader 108 is a controller configured to watch for changes in the configuration maps 116 and automatically trigger updates to the containerized applications 112 that are impacted by the changes in the configuration maps 116. In at least one embodiment, the reloader 108 is a Stakater reloader. In at least one embodiment, a reloader 108 is associated with a Kubernetes cluster. In at least one embodiment, there are a plurality of reloaders 108 and each of the reloaders 108 is associated with a namespace. A namespace in Kubernetes is a way to organize a Kubernetes cluster into virtual sub-clusters or isolated environments to manage resources among multiple users or projects.

When the secrets watcher 114 updates a configuration map 116 associated with a secret with an updated non-secret, the reloader 108 is configured to detect the change in that configuration map 116. The reloader 108 is configured to view the update to the configuration map 116 as an event or a trigger and responsively issue a restart command to restart the containerized applications 112 that use the secret value of the secret associated with the updated configuration map 116. More specifically, responsive to the event, the reloader 108 interacts with the Kubernetes cluster deployments 110. Upon receiving the event associated with a change in a configuration map 116, the reloader 108 scans the deployments 110 and identifies those that mention the configuration map 116 in the specification (either as an annotation, a volume mount, or a source of environment variables). The reloader 108 does not directly deal with the secrets. The reloader 108 identifies the containerized application(s) 116 impacted by the change in the secret value of the secret having the identified secret name. There are replicas of the containerized application(s) 116 impacted by the change in the secret value of the secret within different pods of the Kubernetes cluster. In at least one embodiment, the reloader 108 performs a rollout restart of all of the replicas of the containerized applications 116. In an embodiment, the reloader 108 performs a rollout restart of the pods including all of the replicas of the containerized applications 116. During the restart process of each of the containerized applications 116, the secret at the containerized application 116 is updated from the previous secret value to the updated secret value. As a part of the restart process of a containerized application 116, a run vault agent operates as a sidecar to retrieve the updated secret value of the secret from the secrets vault 104 and provide the updated secret value to the containerized application 116.

Figure 2:
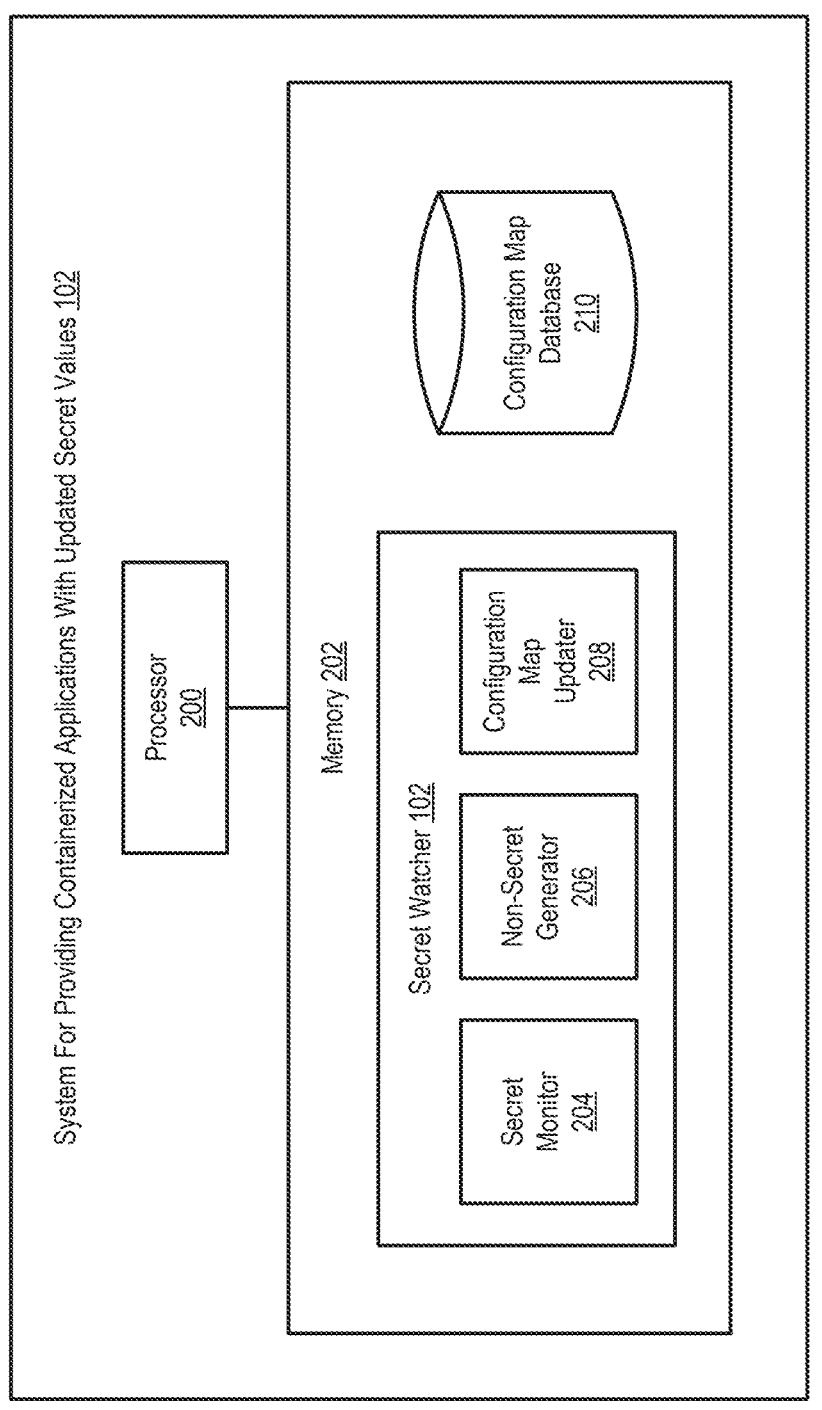
FIG. 2 is a block diagram representation of a system for providing containerized applications with updated secret values in accordance with at least one embodiment.

Referring to FIG. 2, a block diagram representation of a system for providing containerized applications with updated secret values 102 in accordance with at least one embodiment is shown. The system for providing containerized applications with updated secret values 102 includes at least one processor 200 and at least one memory 202. The at least one memory 202 is at least one non-transitory machine-readable storage medium that stores instructions configurable to be executed by the at least one processor 200. The at least one memory 202 includes a secret update monitor 204, a non-secret generator 206, and a configuration map updater 208. In at least one embodiment, the at least one memory includes a configuration map database 210. The configuration map database 210 is configured to store the configuration maps 116. In at least one embodiment, the configuration maps are stored in an etcd instance, which is a distributed key-value store.

The system for providing containerized applications with updated secret values 102 may include additional components that facilitate operation of the system for providing containerized applications with updated secret values 102. It should be appreciated that FIG. 2 depicts a simplified representation of the system for providing containerized applications with updated secret values 102 for purposes of explanation and is not intended to be limiting.

Referring to FIG. 3, a flowchart representation of an exemplary method 300 of providing containerized applications with updated secret values in accordance with at least one embodiment is shown. The method 300 will be described with reference to an exemplary implementation of a system 100 including a system for providing containerized applications with updated secret values 102. As can be appreciated in light of the disclosure, the order of operation within the method 300 is not limited to the sequential execution as illustrated in FIG. 3 but may be performed in one or more varying orders as applicable and in accordance with the present disclosure.

The system for providing containerized applications with updated secret values 102 includes a secrets watcher 114 and a plurality of configuration maps 116. At 302, the secrets watcher 114 detects an update to a secret from a first secret value to a second secret value at a secrets vault 104. At 304, the secrets watcher 114 identifies a configuration map 116 from the plurality of configuration maps 116 that associated with the updated secret. The identified configuration map 116 includes a first non-secret associated with the first secret value. At 306, the secrets watcher 114 generates a second non-secret associated with the second secret value. At 308, the secrets watcher 114 replaces the first non-secret with the second non-secret in the configuration map. At 310, the replacement of the first non-secret with the second non-secret in the configuration map results is an event. At 312, a reloader issues a restart signal to a containerized application associated with the secret in response to the event. At 314, the secret at the containerized application is updated from the first secret value to the second secret value during a restart process initiated by the containerized application in response to the restart signal.

Figure 4:
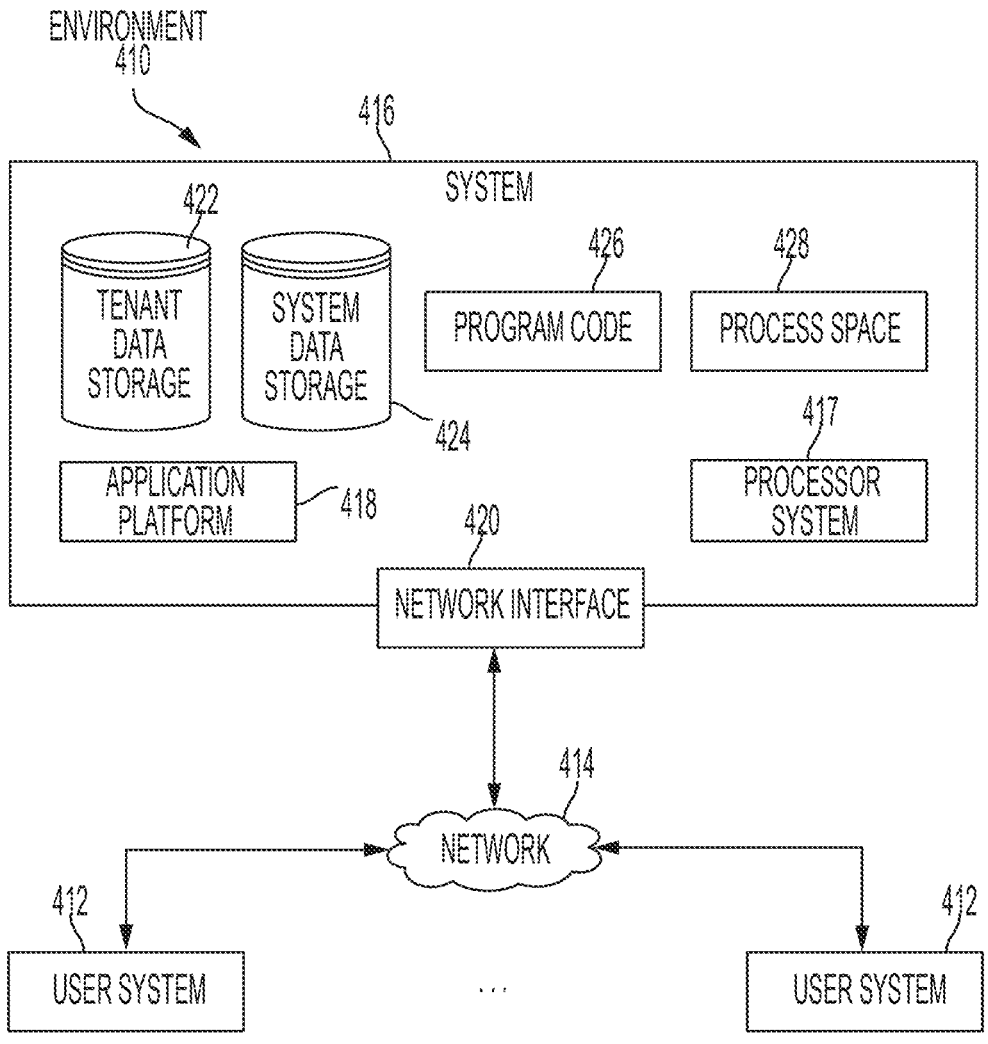
FIG. 4 is a block diagram representation of an example of an environment in which an on-demand database service can be used in accordance with some implementations.

FIG. 4 shows a block diagram of an example of an environment 410 in which an on-demand database service can be used in accordance with some disclosed implementations. The environment 410 includes user systems 412 (also referred to a client device), a network 414, a database system 416 (also referred to herein as a "cloud-based system"), a processor system 417, an application platform 418, a network interface 420, tenant database 422 for storing tenant data 423, system database 424 for storing system data 425, program code 426 for implementing various functions of the system 416, and process space 428 for executing database system processes and tenant-specific processes, such as running applications as part of an application hosting service. In some other implementations, environment 410 may not have all of these components or systems, or may have other components or systems instead of, or in addition to, those listed above.

In some implementations, the environment 410 is an environment in which an on-demand database service exists. An on-demand database service, such as that which can be implemented using the system 416, is a service that is made available to users outside of the enterprise(s) that own, maintain or provide access to the system 416. As described above, such users generally do not need to be concerned with building or maintaining the system 416. Instead, resources provided by the system 416 may be available for such users' use when the users need services provided by the system 416; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 418 can be a framework that allows the applications of system 416 to execute, such as the hardware or software infrastructure of the system 416. In some implementations, the application platform 418 enables the creation, management and execution of one or more applications developed by the provider of the on-demand database service, users accessing the on-demand database service via user systems 412, or third-party application users accessing the on-demand database service via user systems 412.

In some implementations, the system 416 implements a web-based customer relationship management (CRM) system. For example, in some such implementations, the system 416 includes application servers configured to implement and execute CRM software applications as well as provide related data, code, forms, renderable webpages and documents and other information to and from user systems 412 and to store to, and retrieve from, a database system related data, objects, and Webpage content. In some MTS implementations, data for multiple tenants may be stored in the same physical database object in tenant database 422. In some such implementations, tenant data is arranged in the storage medium(s) of tenant database 422 so that data of one tenant is kept logically separate from that of other tenants so that one tenant does not have access to another tenant's data, unless such data is expressly shared. The system 416 also implements applications other than, or in addition to, a CRM application. For example, the system 416 can provide tenant access to multiple hosted (standard and custom) applications, including a CRM application. User (or third-party user) applications, which may or may not include CRM, may be supported by the application platform 418. The application platform 418 manages the creation and storage of the applications into one or more database objects and the execution of the applications in one or more virtual machines in the process space of the system 416.

According to some implementations, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 414 can be or include any network or combination of networks of systems or devices that communicate with one another. For example, the network 414 can be or include any one or any combination of a LAN (local area network), WAN (wide area network), telephone network, wireless network, cellular network, point-to-point network, star network, token ring network, hub network, or other appropriate configuration. The network 414 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 412 can communicate with system 416 using TCP/IP and, at a higher network level, other common Internet protocols to communicate, such as HTTP, FTP, AFS, WAP, etc. In an example where HTTP is used, each user system 412 can include an HTTP client commonly referred to as a "web browser" or simply a "browser" for sending and receiving HTTP signals to and from an HTTP server of the system 416. Such an HTTP server can be implemented as the sole network interface 420 between the system 416 and the network 414, but other techniques can be used in addition to or instead of these techniques. In some implementations, the network interface 420 between the system 416 and the network 414 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 412 can be implemented as any computing device(s) or other data processing apparatus or systems usable by users to access the database system 416. For example, any of user systems 412 can be a desktop computer, a workstation, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 412 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 416) of the user system 412 to access, process and view information, pages and applications available to it from the system 416 over the network 414.

Each user system 412 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 412 in conjunction with pages, forms, applications and other information provided by the system 416 or other systems or servers. For example, the user interface device can be used to access data and applications hosted by system 416, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 412 may differ in their respective capacities, and the capacity of a particular user system 412 can be entirely determined by permissions (permission levels) for the current user of such user system. For example, where a salesperson is using a particular user system 412 to interact with the system 416, that user system can have the capacities allotted to the salesperson. However, while an administrator is using that user system 412 to interact with the system 416, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 412 and some or all of its components are operator-configurable using applications, such as a browser, including computer code executed using a central processing unit (CPU) such as an Intel Pentium® processor or the like. Similarly, the system 416 (and additional instances of an MTS, where more than one is present) and all of its components can be operator-configurable using application(s) including computer code to run using the processor system 417, which may be implemented to include a CPU, which may include an Intel Pentium® processor or the like, or multiple CPUs.

The system 416 includes tangible computer-readable media having non-transitory instructions stored thereon/in that are executable by or used to program a server or other computing system (or collection of such servers or computing systems) to perform some of the implementation of processes described herein. For example, computer program code 426 can implement instructions for operating and configuring the system 416 to intercommunicate and to process webpages, applications and other data and media content as described herein. In some implementations, the computer code 426 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, JAVA®, JAVASCRIPT®, ActiveX®, any other scripting language, such as VBScript®, and many other programming languages as are well known may be used. (JAVA™ is a trademark of Sun Microsystems, Inc.).

Figure 5:
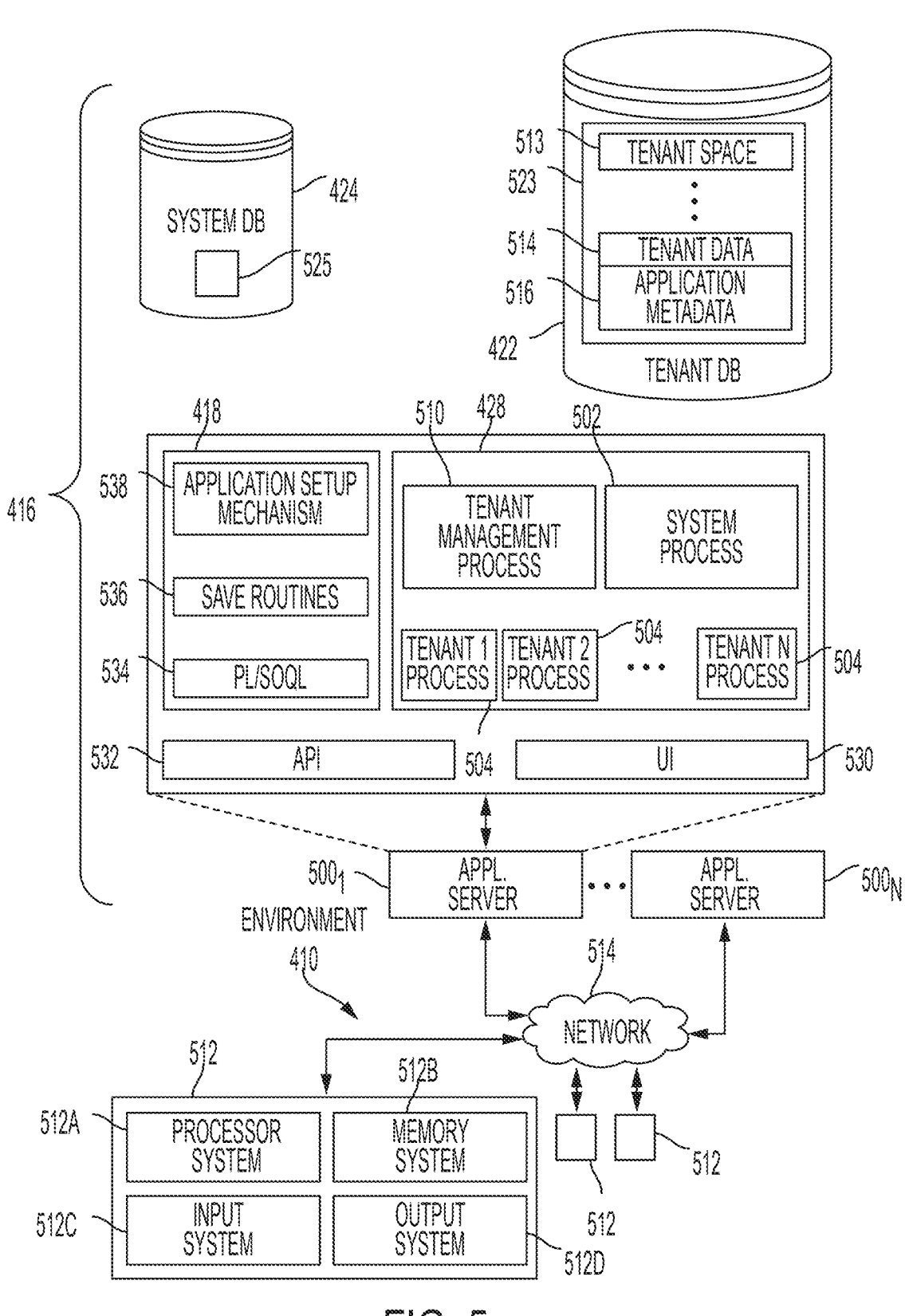
FIG. 5 is a block diagram representation of example implementations of elements of FIG. 4 and example interconnections between these elements according to some implementations.

FIG. 5 shows a block diagram of example implementations of elements of FIG. 4 and example interconnections between these elements according to some implementations. That is, FIG. 5 also illustrates environment 410, but in FIG. 5, various elements of the system 416 and various interconnections between such elements are shown with more specificity according to some more specific implementations. Elements from FIG. 4 that are also shown in FIG. 5 will use the same reference numbers in FIG. 4 as were used in FIG. 4. Additionally, in FIG. 5, the user system 512 includes a processor system 512A, a memory system 512B, an input system 512C, and an output system 512D. The processor system 512A can include any suitable combination of one or more processors. The memory system 512B can include any suitable combination of one or more memory devices. The input system 512C can include any suitable combination of input devices, such as one or more touchscreen interfaces, keyboards, mice, trackballs, scanners, cameras, or interfaces to networks. The output system 512D can include any suitable combination of output devices, such as one or more display devices, printers, or interfaces to networks.

In FIG. 5, the network interface 420 of FIG. 4 is implemented as a set of HTTP application servers $500_1$-$500_N$. Each application server 500, also referred to herein as an "app server," is configured to communicate with tenant database 422 and the tenant data 523 therein, as well as system database 424 and the system data 525 therein, to serve requests received from the user systems 412. The tenant data 423 can be divided into individual tenant storage spaces 513, which can be physically or logically arranged or divided. Within each tenant storage space 513, tenant data 514 and application metadata 516 can similarly be allocated for each user. For example, a copy of a user's most recently used (MRU) items can be stored to tenant data 514. Similarly, a copy of MU items for an entire organization that is a tenant can be stored to tenant storage space 513.

The process space 428 includes system process space 502, individual tenant process spaces 504 and a tenant management process space 510. The application platform 418 includes an application setup mechanism 538 that supports application users' creation and management of applications. Such applications and others can be saved as metadata into tenant database 422 by save routines 536 for execution by subscribers as one or more tenant process spaces 504 managed by tenant management process 510, for example. Invocations to such applications can be coded using PL/SOQL 534, which provides a programming language style interface extension to API 532. Invocations to applications can be detected by one or more system processes, which manage retrieving application metadata 516 for the subscriber making the invocation and executing the metadata as an application in a virtual machine.

The system 416 of FIG. 5 also includes a user interface (UI) 530 and an application programming interface (API) 532 to system resident processes to users or users at user systems 412. In some other implementations, the environment 410 may not have the same elements as those listed above or may have other elements instead of, or in addition to, those listed above.

Each application server 500 can be communicably coupled with tenant database 522 and system database 524, for example, having access to tenant data 523 and system data 525, respectively, via a different network connection. For example, one application server $500_1$ can be coupled via the network 414 (for example, the Internet), another application server $1400_N$ can be coupled via a direct network link, and another application server (not illustrated) can be coupled by yet a different network connection. Transfer Control Protocol and Internet Protocol (TCP/IP) are examples of typical protocols that can be used for communicating between application servers 500 and the system 416. However, it will be apparent to one skilled in the art that other transport protocols can be used to optimize the system 416 depending on the network interconnections used.

In some implementations, each application server 500 is configured to handle requests for any user associated with any organization that is a tenant of the system 416. Because it can be desirable to be able to add and remove application servers 500 from the server pool at any time and for various reasons, in some implementations there is no server affinity for a user or organization to a specific application server 500. In some such implementations, an interface system implementing a load balancing function (for example, an F5 Big-IP load balancer) is communicably coupled between the application servers 500 and the user systems 412 to distribute requests to the application servers 500. In one implementation, the load balancer uses a least-connections algorithm to route user requests to the application servers 500. Other examples of load balancing algorithms, such as round robin and observed-response-time, also can be used. For example, in some instances, three consecutive requests from the same user could hit three different application servers 500, and three requests from different users could hit the same application server 500. In this manner, by way of example, system 416 can be a multi-tenant system in which system 416 handles storage of, and access to, different objects, data and applications across disparate users and organizations.

In one example storage use case, one tenant can be a company that employs a sales force where each salesperson uses system 416 to manage aspects of their sales. A user can maintain contact data, leads data, customer follow-up data, performance data, goals and progress data, etc., all applicable to that user's personal sales process (for example, in tenant database 422). In an example of an MTS arrangement, because all of the data and the applications to access, view, modify, report, transmit, calculate, etc., can be maintained and accessed by a user system 412 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 416 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 416 also can maintain system level data usable by multiple tenants or other data. Such system level data can include industry reports, news, postings, and the like that are sharable among tenants.

In some implementations, the user systems 412 (which also can be client systems) communicate with the application servers 500 to request and update system-level and tenant-level data from the system 416. Such requests and updates can involve sending one or more queries to tenant database 422 or system database 424. The system 416 (for example, an application server 500 in the system 416) can automatically generate one or more SQL statements (for example, one or more SQL queries) designed to access the desired information. System database 424 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 6:
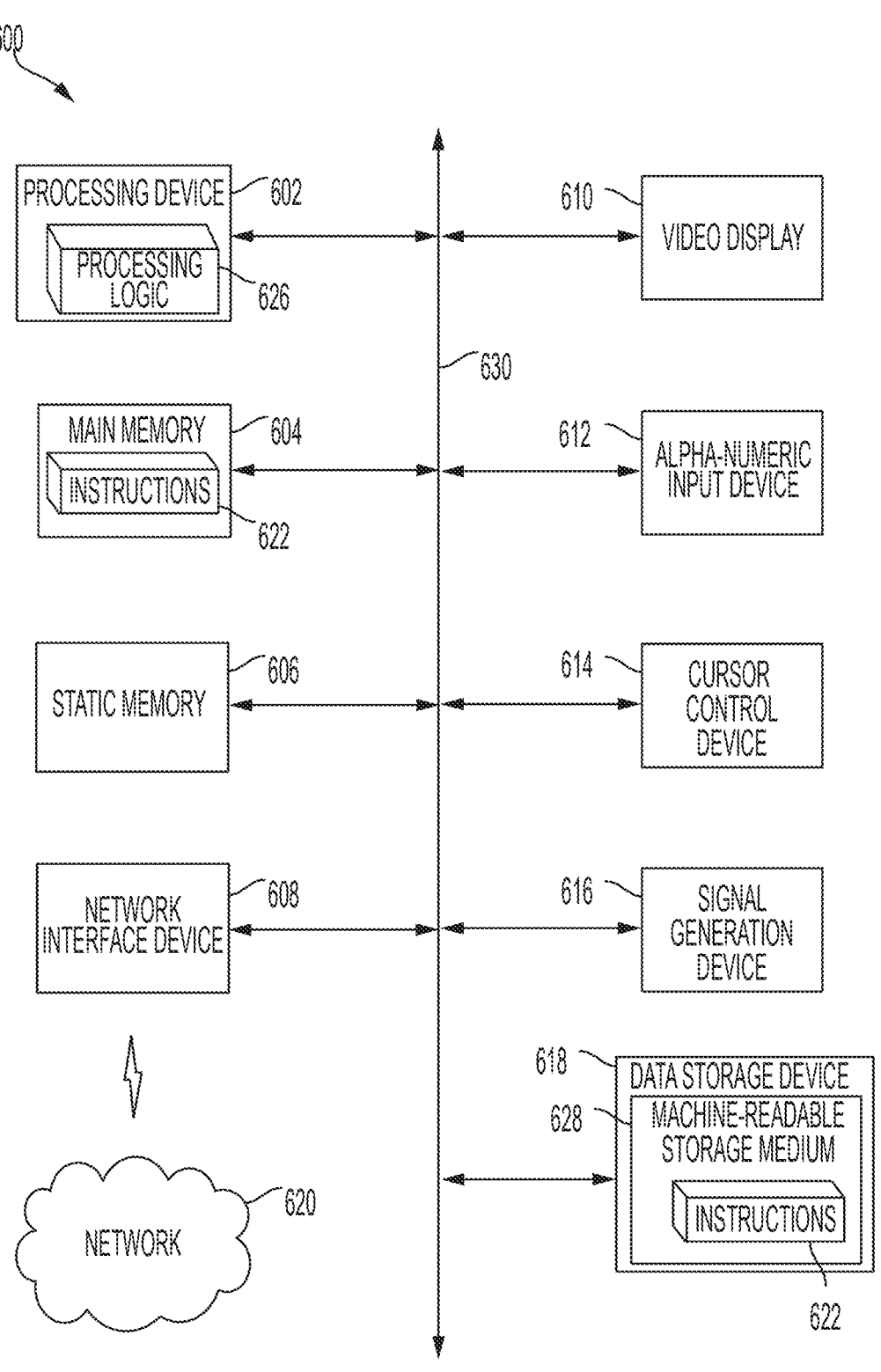
FIG. 6 is a diagrammatic representation of a machine in an exemplary form of a computer system within which a set of instructions, for causing the machine to perform any one or more of the methodologies discussed herein, may be executed.

FIG. 6 illustrates a diagrammatic representation of a machine in the exemplary form of a computer system 600 within which a set of instructions for causing the machine to perform any one or more of the methodologies discussed herein, may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a user system, a client device, or a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In at least one embodiment, computer system 600 may represent, for example, elements of the cloud-based computing platform or any other elements of FIG. 1 (e.g. clients, computing systems used by the customers 150, the third-party application exchange 160) or any elements of FIGS. 4 through 6, etc.

The exemplary computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions 622 (e.g., instructions of in-memory buffer service 94) embodying any one or more of the methodologies or functions described herein. The instructions 622 may also reside, completely or at least partially, within the main memory 604 and/or within processing logic 626 of the processing device 602 during execution thereof by the computer system 600, the main memory 604 and the processing device 602 also constituting computer-readable media. The instructions may further be transmitted or received over a network 620 via the network interface device 608.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real time," "offline," " in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general-purpose digital computer, by using a special-purpose computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, at least one embodiment of a system or a component may employ various integrated circuit components, e.g., memory elements, digital signal processing elements, logic elements, look-up tables, or the like, which may carry out a variety of functions under the control of one or more microprocessors or other control devices.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Any suitable programming language can be used to implement the routines of particular embodiments including C, C++, JAVA®, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiments. It should be understood that various changes can be made in the function and arrangement of elements without departing from the scope defined by the claims, which includes known equivalents and foreseeable equivalents at the time of filing this patent application.

What is claimed is:

1. A method for providing containerized applications with updated secret values, the method comprising:

detecting, by a secret watcher, an update to a first secret from a first secret value to a second secret value at a secrets vault;

identifying, by the secret watcher, a first configuration map associated with the first secret, wherein the first configuration map comprises a first non-secret associated with the first secret value;

generating, by the secret watcher, a second non-secret associated with the second secret value; and replacing, by the secret watcher, the first non-secret with the second non-secret in the first configuration map, wherein:

the replacement of the first non-secret with the second non-secret in the first configuration map results is an event, a reloader issues a restart signal to at least one containerized application associated with the first secret in response to the event, and the first secret at the at least one containerized application is updated from the first secret value to the second secret value during a restart process initiated by the at least one containerized application in response to the restart signal.

2. The method of claim 1, wherein the at least one containerized application comprises a plurality of replica containerized applications associated with the first secret and the reloader issues a restart signal to the plurality of replica containerized applications.

3. The method of claim 1, wherein the generating, by the secret watcher, the second non-secret comprises generating a checksum of the second secret value.

4. The method of claim 1, wherein the at least one containerized application is part of a Kubernetes cluster.

5. The method of claim 1, further comprising monitoring, by the secrets watcher, a first plurality of secrets maintained at the secrets vault to detect updates to secret values of the first plurality of secrets, wherein:

the first plurality of secrets are associated with a Kubernetes pod comprising a first plurality of containerized applications, the first plurality of secrets include the first secret, and the first plurality of containerized applications include the at least one containerized application.

6. The method of claim 1, further comprising monitoring, by the secrets watcher, a second plurality of secrets maintained at the secrets vault to detect updates to secret values of the second plurality of secrets, wherein:

the second plurality of secrets are associated with a Kubernetes cluster comprising a second plurality of containerized applications, the second plurality of secrets include the first secret, and the second plurality of containerized applications include the at least one containerized application.

7. The method of claim 1, wherein the reloader is a Stakater reloader.

8. The method of claim 1, wherein the first configuration map associated with the first secret is one of a third plurality of configurations maps associated with a third plurality of secrets, wherein updates to the secret values of the third plurality of secrets at the secrets vault is monitored by the secrets watcher and the third plurality of secrets includes the first secret.

9. A system for providing containerized applications with updated secret values, the system comprising:

at least one processor; and at least one non-transitory machine-readable storage medium that stores instructions configurable to be executed by the at least one processor to:

detect an update to a first secret from a first secret value to a second secret value at a secrets vault;

identify a first configuration map associated with the first secret, wherein the first configuration map comprises a first non-secret associated with the first secret value;

generate a second non-secret associated with the second secret value; and replace the first non-secret with the second non-secret in the first configuration map, wherein:

the replacement of the first non-secret with the second non-secret in the first configuration map results is an event, a reloader issues a restart signal to at least one containerized application associated with the first secret in response to the event, and the first secret at the at least one containerized application is updated from the first secret value to the second secret value during a restart process initiated by the at least one containerized application in response to the restart signal.

10. The system of claim 9, wherein the at least one containerized application comprises a plurality of replica containerized applications associated with the first secret and the reloader issues a restart signal to the plurality of replica containerized applications.

11. The system of claim 9, wherein the instructions are configurable to be executed by the at least one processor to generate the second non-secret, the generation of the second non-secret comprising generating a checksum of the second secret value.

12. The system of claim 9, wherein the at least one containerized application is part of a Kubernetes cluster.

13. The system of claim 9, wherein the instructions are configurable to be executed by the at least one processor to monitor a first plurality of secrets maintained at the secrets vault to detect updates to secret values of the first plurality of secrets, wherein:

the first plurality of secrets are associated with a Kubernetes pod comprising a first plurality of containerized applications, the first plurality of secrets include the first secret, and the first plurality of containerized applications include the at least one containerized application.

14. The system of claim 9, wherein the instructions are configurable to be executed by the at least one processor to monitor a second plurality of secrets maintained at the secrets vault to detect updates to secret values of the second plurality of secrets, wherein:

the second plurality of secrets are associated with a Kubernetes cluster comprising a second plurality of containerized applications, the second plurality of secrets include the first secret, and the second plurality of containerized applications include the at least one containerized application.

15. The system of claim 9, wherein the reloader is a Stakater reloader.

16. The system of claim 9, wherein:

the first configuration map associated with the first secret is one of a third plurality of configurations maps associated with a third plurality of secrets, the third plurality of secrets includes the first secret, and the instructions are configurable to be executed by the at least one processor to monitor updates to the secret values of the third plurality of secrets at the secrets vault.

17. At least one non-transitory machine-readable storage medium that stores instructions executable by at least one processor, the instructions configurable to cause the at least one processor to perform operations comprising:

detecting an update to a first secret from a first secret value to a second secret value at a secrets vault;

identifying a first configuration map associated with the first secret, wherein the first configuration map comprises a first non-secret associated with the first secret value;

generating a second non-secret associated with the second secret value; and replacing the first non-secret with the second non-secret in the first configuration map, wherein:

the replacement of the first non-secret with the second non-secret in the first configuration map results is an event, a reloader issues a restart signal to at least one containerized application associated with the first secret in response to the event, and the first secret at the at least one containerized application is updated from the first secret value to the second secret value during a restart process initiated by the at least one containerized application in response to the restart signal.

18. The at least one non-transitory machine-readable storage medium of claim 17, wherein the at least one containerized application comprises a plurality of replica containerized applications associated with the first secret and the reloader issues a restart signal to the plurality of replica containerized applications.

19. The at least one non-transitory machine-readable storage medium of claim 17, wherein the instructions are configurable to cause the at least one processor to further perform operations comprising generating the second non-secret, the second non-secret comprising a checksum of the second secret value.

20. The at least one non-transitory machine-readable storage medium of claim 17, wherein the at least one containerized application is part of a Kubernetes cluster.

* * * * *